Nov. 17, 1964 G. SVOBODA 3,157,220

APPARATUS FOR FORMING WIRE

Filed May 24, 1961 3 Sheets-Sheet 1

INVENTOR
G. SVOBODA
BY [signature]
ATTORNEY

APPARATUS FOR FORMING WIRE

Filed May 24, 1961

INVENTOR
G. SVOBODA
BY [signature]
ATTORNEY

INVENTOR
G. SVOBODA
BY R. LeCamp
ATTORNEY

United States Patent Office 3,157,220
Patented Nov. 17, 1964

3,157,220

APPARATUS FOR FORMING WIRE

George Svoboda, Albuquerque, N. Mex., assignor to Western Electric Company, Incorporated, New York, N.Y., a corporation of New York Filed May 24, 1961, Ser. No. 112,346
10 Claims. (Cl. 153—2)

This invention relates to wire forming apparatus, and more particularly to wire forming apparatus for forming a bend in a wire about a mandrel and subsequently stripping the formed wire from the mandrel. It is an object of this invention to provide new and improved appratus of this character.

It is standard practice to form axially extending wire leads of certain electrical components by shearing the leads to proper lengths and bending the ends of the sheared leads to desired configurations to facilitate connection of the components into electrical circuits. In one lead shearing and bending apparatus for this purpose, a component is positioned in a nest with each lead of the component adjacent the end of a respective rotatable cylindrical head member, between a mandrel projecting from the end of the head member centrally thereof and a bending element on the end of the head member spaced radially with respect to the mandrel. This apparatus, which is manually operated, first shears the leads to proper lengths and subsequently, by rotation of the head members, the bending elements on the head members bend the sheared leads about the mandrels. The formed component then must be removed from the apparatus by hand, which removal is often difficult because the components generally are small in size and not easily grasped. Further, the leads of the components tend to bind between the bending elements and the mandrels and a component often must be pried from the nest by a suitable tool, which generally results in damage to the component. Thus, the shearing and bending of component leads with this apparatus is relatively inefficient, uneconomical and time consuming, especially where a large number of electrical components are being manufactured.

Accordingly, another object of this invention is to provide new and improved apparatus for forming leads of an electrical component rapidly and economically.

A further object of this invention is to provide new and improved apparatus for forming leads of an electrical components which subsequently discharges the formed component into a suitable receptacle without the necessity of manual handling of the component.

A still further object of this invention is to provide new and improved apparatus which is substantially automatic in its operation to shear leads of an electrical component to proper lengths, to bend the ends of the sheared leads into desired configurations, and to discharge the formed component into a suitable receptacle without the necessity of manual handling of the component.

In accordance with the invention, a wire, as for example a wire lead of an electrical component, is bent to a desired configuration by rotating a cylindrical head member so that a bending element on one end of the head member bends the wire about a mandrel in the form of a pin projecting from the head member centrally thereof, after which the formed wire is stripped from the pin by causing relative axial movement of the head member and the pin.

In a preferred embodiment of the invention, pairs of cylindrical head members and associated pins are provided for bending wire leads extending from opposite ends of an electrical component simultaneously. The cylindrical head members and pins are mounted adjacent a nest in a carriage movable between a position in which a component may be received in the nest, and a position in which a component may be discharged from the nest into a suitable receptacle after the bending of the component leads. In this preferred embodiment, wire shearing members also are provided for shearing the ends of the leads to proper lengths prior to the bending thereof.

This invention, together with further objects and advantages thereof, will best be understood by reference to the following detailed description taken in connection with the accompanying drawings, in which.

Figures 1, 8, 10:
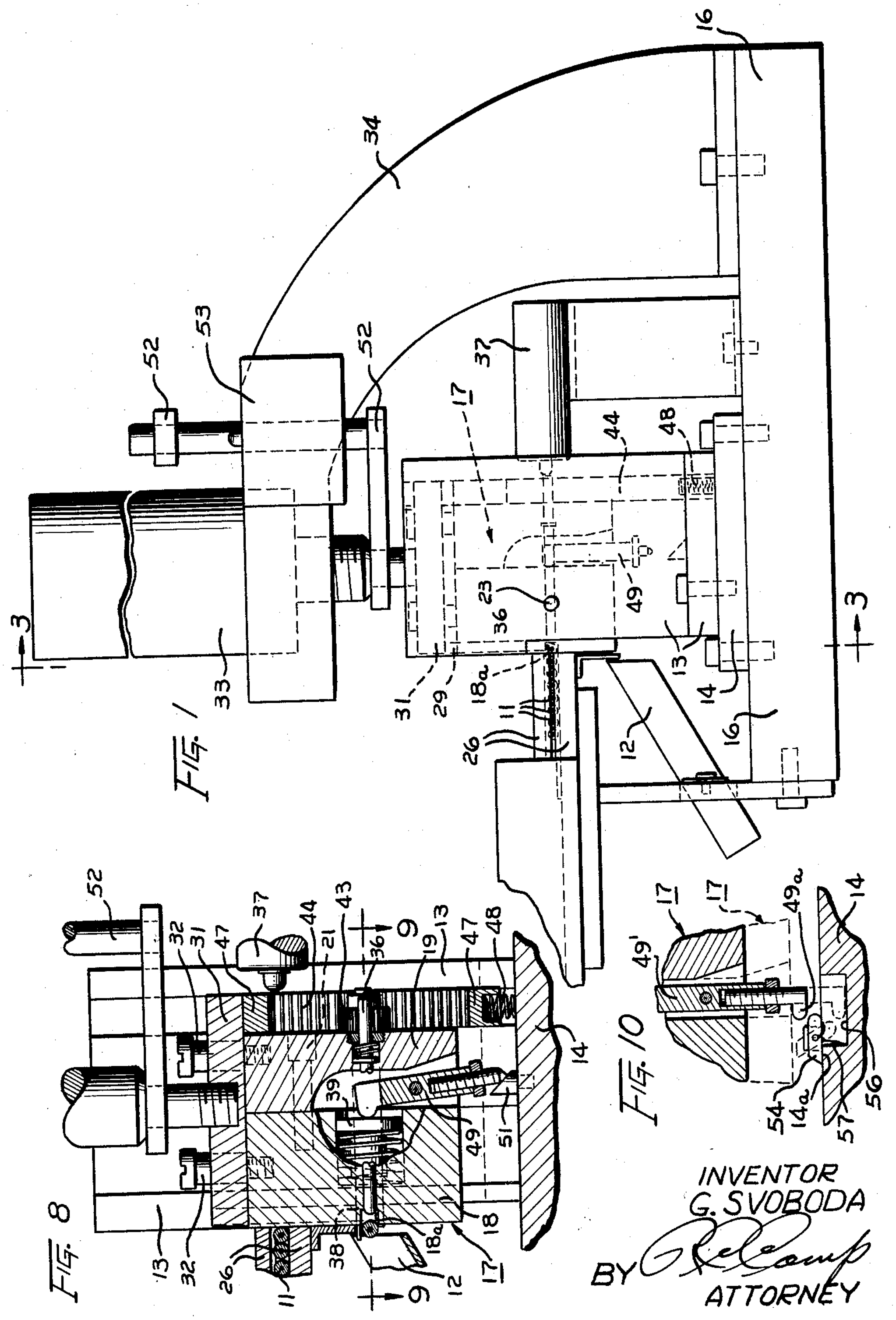
FIG. 1 is a side view of the apparatus in first operating position.
FIG. 8 is a cross-sectional view taken substantially along the line 4—4 of FIG. 3 but showing the apparatus in a third operating position.
FIG. 10 is a partial cross-sectional view similar to FIG. 8 showing a modified form of apparatus.
Figures 4, 5, 9:
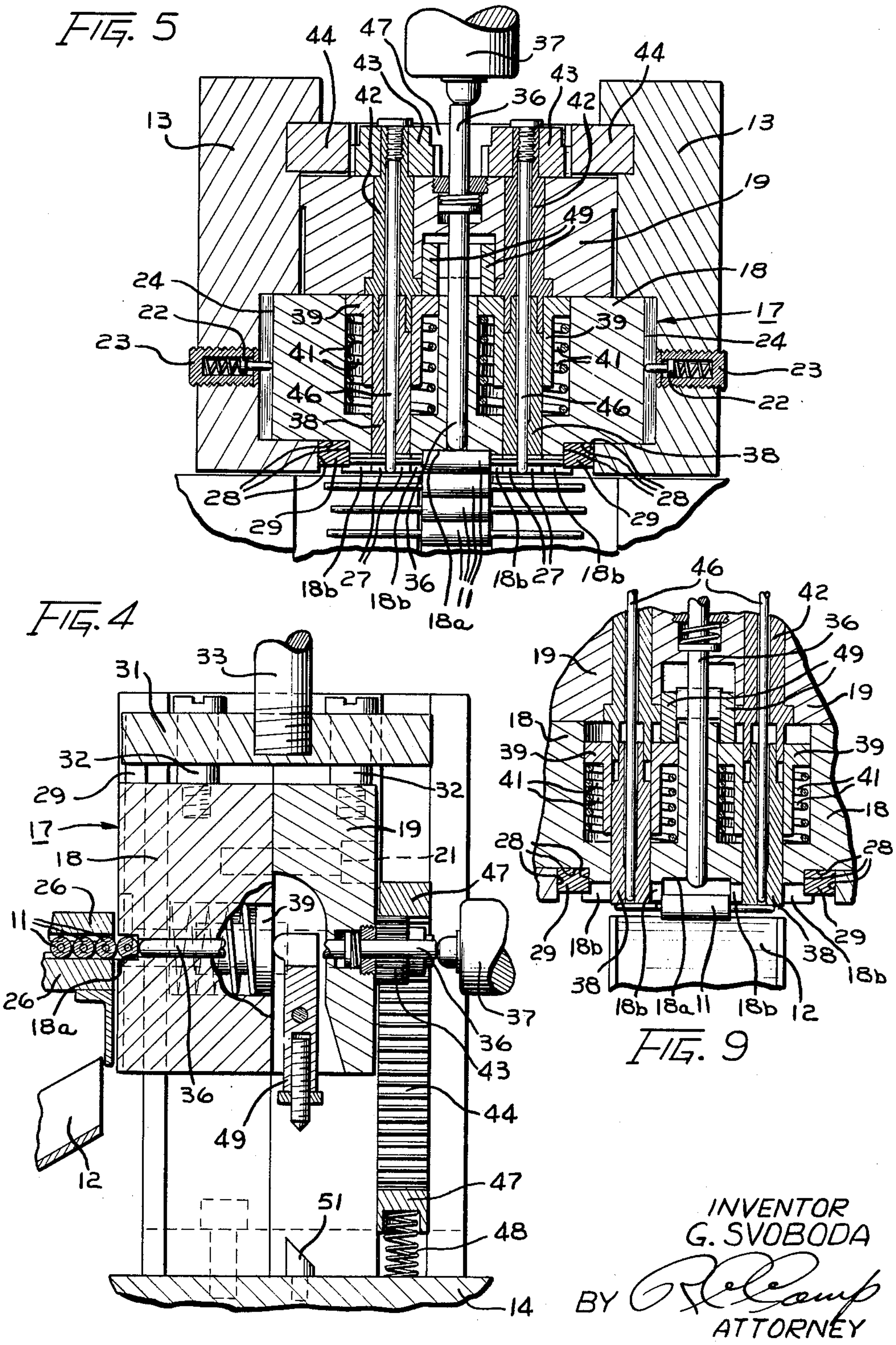
FIG. 4 is a cross-sectional view taken substantially along the line 4—4 of FIG. 3.
FIG. 5 is a cross-sectional view taken substantially along the line 5—5 of FIG. 3.
FIG. 9 is a partial cross-sectional view taken substantially along the line 9—9 of FIG. 8.

As is best shown in FIGS. 6–9, the illustrated embodiment of the invention is designed to shear the leads of an electrical component 11 to proper lengths (FIGS. 6 and 7), to form bends in the ends of the sheared leads (FIG. 7), and subsequently to discharge the component with the formed leads into a discharge chute 12 (FIGS. 8 and 9). It is to be understood that this embodiment is solely for the purpose of illustrating the principles of the invention, and that the principles of the invention are not limited to the specific arrangement shown, but may be used in other arrangements as may readily be devised by those skilled in the art.

Figures 2, 3, 6, 7:
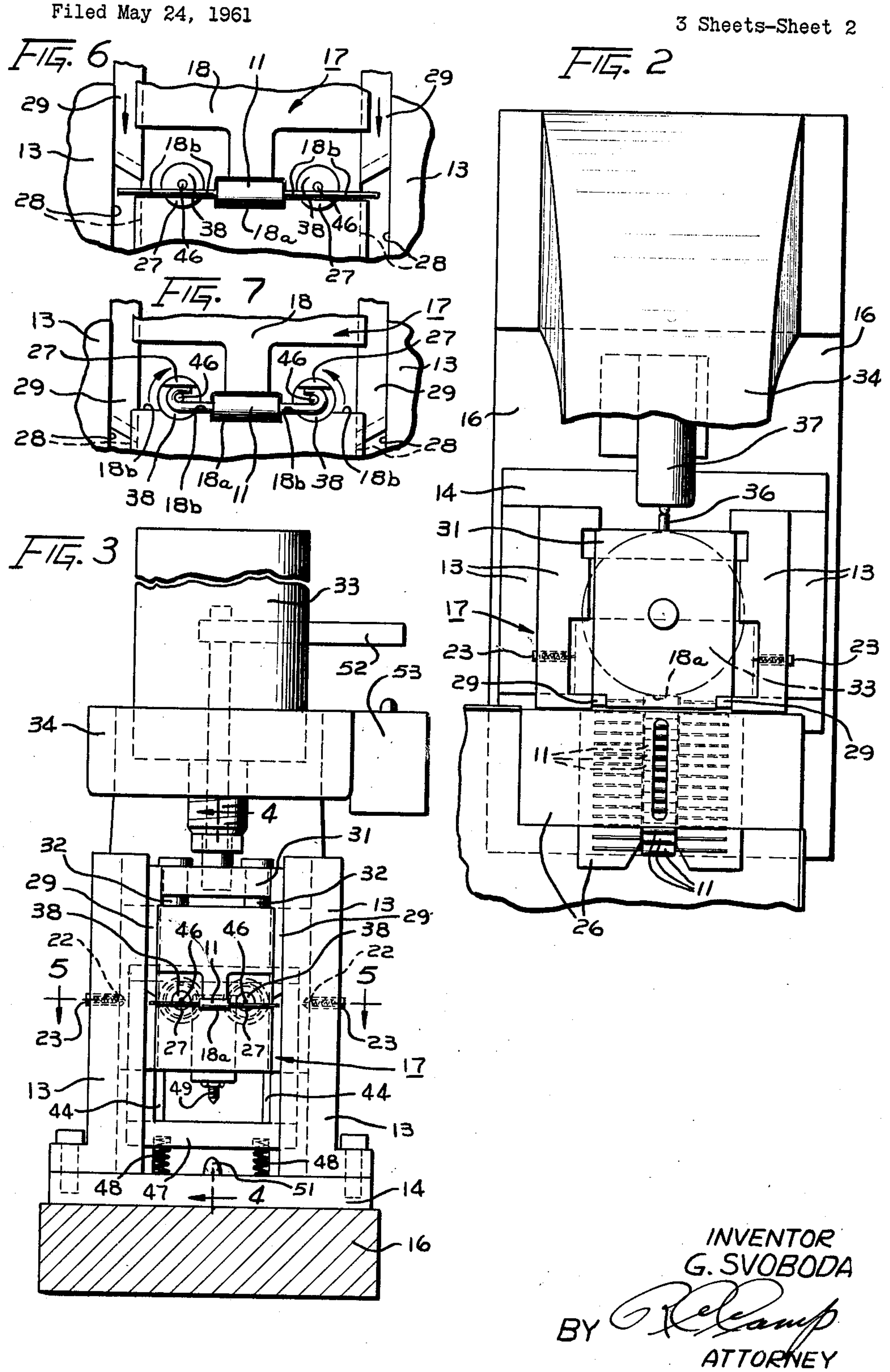
FIG. 2 is a plan view of the apparatus partially broken away.
FIG. 3 is a front view of the apparatus taken substantially along the line 3—3 of FIG. 1.
FIG. 6 is an enlarged partial front view of the apparatus as shown in FIG. 3.
FIG. 7 is an enlarged partial front view similar to FIG. 6 but showing the apparatus in a second operating position.

Referring to FIGS. 1, 2 and 3, it is seen that the illustrated embodiment of the invention includes a pair of laterally spaced upstanding guideway members 13 secured by suitable bolts to a horizontal base plate 14 mounted on a support table 16. As is best shown in FIGS. 4 and 5, a carriage 17 is mounted between the guideway members 13 for vertical reciprocating movement. The carriage 17 is formed by a front block member 18 and a rear block member 19, the block members 18 and 19 being connected together in a suitable manner, as for example by bolts 21 (FIG. 4). The front block member 18 of the carriage 17 includes a nest 18*a* for receiving the electrical components 11 one at a time.

The carriage 17 normally is maintained releasably in a first operating position (FIGS. 1–6) in which components may be fed into the nest 18*a*, by spring biased plungers 22 (FIGS. 3 and 5) which are reciprocably mounted in cylindrical housings 23 threaded through the guideway members 13, and which project from the housings so as to be engageable in notches 24 cut in the sides of the front block member 18. The components 11 are fed into the nest 18*a* from a substantially horizontal feed chute 26 (FIGS. 1, 2 and 4) suitably supported on the front of the support table 16. The components 11 may be fed into the feed chute 26 and moved therethrough into the nest 18*a* either by hand, or by a suitable automatic feeding mechanism (not shown).

As is best shown in FIGS. 5, 6 and 7, adjacent each side of the nest 18*a* is a horizontally extending lead supporting shelf, formed in part by laterally spaced surfaces 18b of the front block member 18, and formed in part by a surface of a lead forming or bending element 27 (subsequently to be described in greater detail) between the surfaces 18b. The lead supporting shelves terminate at their outer ends at vertically extending slots 28 formed by surfaces on the guideway members 13 and the front block member 18, whereby when one of the components 11 is properly positioned in the nest 18a, the leads of the component project beyond the outer ends of the lead supporting shelves into the slots 28 and into the path of lead shearing blades 29 vertically movable in the slots 28.

The upper ends of the lead shearing blades 29 are integrally connected to a horizontal plate 31 (FIGS. 3 and 4) mounted on the carriage 17 for limited vertical movement relative to the carriage by connector members 32 threaded into the tops of the block members 18 and 19. The plate 31 is secured to the lower end of a piston rod of a vertically disposed air-operated ram 33 mounted on the forward end of a standard 34 (FIG. 1) bolted to the support table 16. Mounted in the carriage 17 is a longitudinally slidable actuating pin 36 which is spring biased forwardly with its forward end normally projecting into the nest 18a, so that as one of the components 11 is moved into the nest the actuating pin moves rearwardly to operate a microswitch 37 (FIG. 1) mounted on the support table 16. Operation of the microswitch 37 causes downward operation of the piston rod of the ram 33, to move the plate 31 and the lead shearing blades 29 downward initially relative to the carriage 17, whereby the shearing blades 29 trim off those portions of the leads of the components projecting into the slots 28 (FIGS. 6 and 7).

As is best shown in FIGS. 3 and 5–7, each of the lead bending elements 27 forms an integral part of the front end of a cylindrical head member 38 mounted in the front block member 18 of the carriage 17 for rotatable and axially slidable movement. Each of the cylindrical head members 38 is secured at its other end, as by welding, to a flanged collar 39 (FIG. 5) which normally is biased by a spring 41 into abutting engagement with the rear block member 19 of the carriage. Mounted in the rear block member 19 in axial alignment with each cylindrical head member 38 is a cylindrical drive member 42 having a splined connection at its front end with the head member for rotating the head member and for permitting axial movement of the head member relative to the drive member. The other end of each of the drive members 42 is provided with a gear 43 engaged with a vertically disposed rack 44, whereby upon movement of the carriage 17 vertically downward relative to the rear racks in a manner subsequently to be described, the gears 43 are rotated by the gear racks 44 to rotate the drive members 42 and the head members 38.

Extending axially through each of the drive members 42 and its associated head member 38 is a mandrel in the form of a pin 46, which at one end is threadably mounted in the drive member and which at its other end normally projects beyond the front end of the head member in spaced relationship with respect to the lead bending element 27 on the head member such that a lead of an electrical component 11 is receivable between the pin and the bending element with small clearance. Thus, as shown in FIGS. 6 and 7, upon rotation of the head members 38 the bending elements 27 on the head members bend the leads of one of the components 11 positioned in the nest 18a about the pins 46, and, as shown in FIGS. 8 and 9, upon forward axial movement of the head members 38 relative to the pins, the bent leads of the component may be stripped from the pins.

Referring to FIGS. 3, 4 and 5, it is seen that the gear racks 44 extend parallel to one another and are connected at their upper and lower ends by horizontal cross members 47 to form a substantially rectangular shaped frame which is slidably mounted for vertical movement in the guideway members 13 rearwardly of the carriage 17, and which is resiliently supported on springs 48 (FIGS. 3 and 4) supported on the base plate 14. After the leads of a component have been trimmed by the shearing blades 29, as above described, the downwardly moving horizontal plate 31 engages the top of the carriage 17 and moves the carriage downward relative to the gear rack frame 44, 47, whereby the gear racks 44 of the frame rotate the gears 43 to rotate the drive members 42 and the head members 38, and as noted in the preceding paragraph, the lead bending elements 27 on the head members 38 bend the component leads about the pins 46 (FIGS. 6 and 7). Subsequently, the downwardly moving plate 31 engages the top of the gear rack frame 44, 47 and the carriage 17 and the frame move together vertically downward toward a position in which the component may be discharged from the nest 18a, whereby the gears 43 and gear racks 44 no longer cooperate to rotate the drive members 42 and head members 38, and thus the lead bending elements 27 stop bending the component leads about the pins 46.

Mounted in the rear block member 19 between the drive members 42 is a substantially vertically disposed pivoted arm 49 for causing the above described axial forward movement of the head members 38 relative to the pins 46, to strip the formed component leads from the pins. The upper end of the arm 49 is bifurcated to form a pair of laterally spaced lugs each engaged with a respective one of the collars 39 secured to the head members 38, and the lower end of the arm 49 projects downward beyond the bottom of the carriage 17. The lower end of the arm 49 is located vertically above a cam element 51 threaded, or otherwise suitably mounted, in the base plate 14 so that as the ram 33 moves the horizontal plate 31, the carriage 17, and the gear rack frame 44, 47 downward as a unit toward the position shown in FIG. 8, the lower end of the pivoted arm 49 engages the cam element 51 and is rotated counterclockwise (FIG. 8) to move the head members 38 axially forward relative to the pin 46 to strip the formed leads of the component 11 which is in the nest 18a from the pins and to move the component out of the nest 18a and into the discharge chute 12.

Referring to FIGS. 1 and 3, it is seen that the piston rod of the ram 33 carries a laterally projecting arm assembly 52 which, after one of the components 11 has been discharged into the chute 12, engages and operates a microswitch 53 mounted on one side of the standard 34, to reverse the direction of movement of the piston rod which then moves the carriage 17 and the horizontal plate 31 upward back to their original positions as shown in FIG. 4. When the carriage 17 and the horizontal plate 31 have been returned to their positions as shown in FIG. 4, another component 11 may be moved into the nest 18a and the above described cycle of operation is repeated.

FIG. 10 shows a modified form of apparatus in which the stripping of the formed leads of the components 11 from the pins 46 and movement of the components into the discharge chute 12 is accomplished during upward movement of the carriage 17, rather than during the downward movement of the carriage 17 as above described with regard to the apparatus shown in FIGS. 1–9. In the form of the apparatus shown in FIG. 10, a cam element 54, which corresponds to the cam element 51 in the apparatus of FIGS. 1–9, is pivotally mounted between a pair of laterally spaced upstanding lugs on the base plate 14 on opposite sides of a recess 56 in the base plate. The cam element 54 is resiliently biased in a counterclockwise direction, as viewed in FIG. 10, by a coil spring 57 against a stop formed by the upper surface of the base plate at 14a, and is free to pivot clockwise into the recess 56 into the position as shown by dashed lines. A pivoted arm 49', which corresponds to the arm 49 of the apparatus of FIGS. 1–9, is pivotally mounted on the carriage 17 and is provided at its lower end with a laterally projecting lug 49a. As the carriage 17 moves vertically downward, the lower end of the arm 49′ moves into the recess 56 with the laterally projecting lug 49a engaging the cam element 54 and causing pivotal movement thereof into the recess 56 until the lug 49a has passed by the cam element, whereupon the coil spring 57 returns the cam element to its position as shown in solid lines. At this time, the carriage 17 is below the discharge position thereof as shown in FIG. 8 for the apparatus of FIGS. 1–9. Upon subsequent upward movement of the carriage 17, the cam element 54 engages the laterally projecting lug 49a and causes the arm 49′ to rotate counterclockwise to move the head members 38 axially relative to the pins 46, as above described with regard to the apparatus in FIGS. 1–9, to strip the formed component leads from the pins and to discharge the component into the chute 12. Preferably, this discharging operation takes place after the carriage has started to move relative to the gear rack carrying frame 44, 47 and the head members 38 have started to rotate back to their original positions, so that binding of the formed leads between the forming elements 27 and the mandrels 46, tending to prevent stripping of the formed leads from the mandrels, is reduced substantially to a minimum.

While the illustrated embodiment of the invention is shown as forming U-shaped bends in the component leads, it is contemplated that the degree to which the leads of the component are bent by the lead bending elements 27 may be varied as desired, as for example, by varying the distance which the carriage 17 moves relative to the gear rack frame 44, 47. Similarly, it is contemplated that by varying the length of the time of operation of each of the head members 38 relative to the other, the leads of the components may be formed to different shapes. For example, this readily could be accomplished by eliminating a portion of the teeth on one of the gear racks 44 at its upper or lower end, so that one of the head members would be rotated a greater amount of time and a greater amount than the other.

From the foregoing description, it is apparent that the rotatable and axially slidable head members 38 and lead bending elements 27 thereon first rotate about the pins 46 to form bends in the wire leads of a component 11, and subsequently move axially relative to the pins to positively strip the formed wire leads from the pins without the necessity of manual handling of the component to remove the formed wire leads from the pins. Further, in applicant's apparatus, the two formed wire leads of the component 11 are stripped from the pins 46 simultaneously, and thus damage to the component, as for example, pulling of the wire leads out of the body of the component, is substantially reduced as compared to apparatus from which the component must be removed by hand. In addition, the novel arrangement wherein the lead shearing blades 29 first move relative to the carriage 17 to shear the wire leads of the component, the carriage then moving relative to the gear racks 44 for forming bends in the sheared leads, and the carriage 17 and gear racks subsequently moving as a unit to stop the bending of the leads, and to permit operation of the pivoted arm 49 on the carriage to move the head members 38 axially of the pins 46, whereby the stripping of the formed leads from the pins 46 may be accomplished, provides an efficient apparatus which readily lends itself to automatic operation by the single ram 33, and which can be employed to shear and bend wire leads of electrical components in large quantities rapidly and economically.

While the preferred embodiment of the invention has been disclosed, many modifications will be apparent, and it is intended that the invention be interpreted as including all modifications which fall within the true spirit and scope of the invention.

What is claimed is:

1. Apparatus for forming wire, which comprises a movable carriage, a cylindrical head in said carriage rotatable about its axis, a pin extending through an axial bore in said head, said head and said pin being movable axially relative to one another, resilient means for urging said head and said pin toward normal positions with respect to one another in which said pin projects beyond one end of said head, a forming element projecting from said one end of said head and spaced from said pin, means for moving said carriage, means responsive to the movement of said carriage for rotating said head whereby a wire received between said pin and said forming element is bent by said forming element about said pin, and means responsive to the movement of said carriage for moving said head and said pin axially relative to one another against the action of said resilient means, whereby the formed wire may be stripped from said pin.

2. Apparatus for forming wire, which comprises a movable carriage including a nest for receiving the wire, a cylindrical head mounted in said carriage for rotation about its axis and for axially slidable movement, a pin substantially fixed against axial movement relative to said carriage and extending through an axial bore in said head, resilient means urging said head toward a normal position in which said pin projects beyond one end of said head, a forming element projecting from said one end of said head and spaced from said pin, means for moving said carriage, means responsive to the movement of said carriage for rotating said head whereby a wire received between said pin and said forming element is bent by said forming element about said pin, and means responsive to the movement of said carriage for moving said head from its normal position axially relative to said pin against the action of said resilient means, whereby the formed wire may be stripped from said pin and discharged from said nest.

3. Apparatus for forming leads of electrical components, which comprises a movable carriage including a nest for receiving an electrical component, a pair of cylindrical heads in said carriage each rotatable about an axis extending substantially perpendicular to a lead of the component when the component is positioned in the nest, and each axially slidable in said carriage, a pin extending through an axial bore in each of said heads, resilient means urging said heads toward normal positions in which said pins project beyond the ends of said heads adjacent the nest, a forming element projecting from said end of each head adjacent the nest and spaced from the pin associated with said head, gear means drivingly connected to said heads, rack means cooperable with said gear means for rotating said heads, means for moving said carriage relative to said rack means whereby said rack means and said gear means rotate said heads and component leads received between said pins and said forming elements are bent by said forming elements about said pins, and means for moving said heads from their normal positions axially relative to said pins against the action of said resilient means, whereby the formed leads may be stripped from said pins.

4. Apparatus for forming leads of electrical components, which comprises a reciprocable carriage including a nest for receiving an electrical component, a pair of cylindrical heads in said carriage each rotatable about an axis extending substantially perpendicular to a lead of the component when the component is positioned in the nest, and each axially slidable in said carriage, a bending pin extending through an axial bore in each of said heads, resilient means urging said heads toward normal positions in which said pins project beyond the ends of said heads adjacent the nest, a forming element projecting from said end of each head adjacent the nest and spaced from the pin associated with said head, gear means drivingly connected to said heads, rack means cooperable with said gear means for rotating said heads and movable in a direction parallel to the direction of movement of said carriage, means for moving said carriage relative to said rack means whereby said rack means and said gear means rotate said heads and component leads received between said pins and said forming elements are bent by said forming elements about said pins, means on said carriage for subsequently moving said rack means with said carriage whereby said forming elements stop bending the leads about said pins, and means for moving said heads from their normal positions axially relative to said pins against the action of said resilient means, whereby the formed leads may be stripped from said pins.

5. Apparatus for forming leads of electrical components, which comprises a reciprocable carriage including a nest for receiving an electrical component, a pair of cylindrical heads in said carriage each rotatable about an axis extending substantially perpendicular to a lead of the component when the component is positioned in the nest, and each axially slidable in said carriage, a pin extending through an axial bore in each of said heads, resilient means urging said heads toward normal positions in which said pins project beyond the ends of said heads adjacent the nest, a forming element projecting from said end of each head adjacent the nest and spaced from the pin associated with said head, gear means drivingly connected to said heads, rack means cooperable with said gear means for rotating said heads, means for moving said carriage relative to said rack means whereby said rack means and said gear means rotate said heads and component leads received between said pins and said forming elements are bent by said forming elements about said pins, a pivoted member on said carriage for moving said heads from their normal positions axially relative to said pins against the action of said resilient means, whereby the formed leads may be stripped from said pins, and cam means engageable with said pivoted member for pivoting said pivoted member.

6. Apparatus for shearing and bending leads of electrical components, which comprises a movable carriage including a nest for receiving an electrical component, a pair of cylindrical heads in said carriage each rotatable about an axis extending substantially perpendicular to a lead of the component when the component is positioned in the nest, a pin extending through an axial bore in each of said heads, said heads and said pins being movable axially relative to one another, resilient means urging said heads and said pins toward normal positions with respect to one another in which said pins project beyond the ends of said heads adjacent the nest, a forming element projecting from said end of each head adjacent the nest and spaced from the pin associated with said head, a member slidably mounted on said carriage for limited movement relative to said carriage in the direction of movement of said carriage, lead shearing means, including a shearing blade carried by said slidably mounted member, spaced a predetermined distance from the longitudinal axis of each of said pins for shearing a lead to proper length, means for moving said slidably mounted member, resilient means for restraining movement of said carriage with said slidably mounted member whereby said shearing means shear the component leads to proper length, said slidably mounted member subsequently moving said carriage therewith, means responsive to the movement of said carriage for rotating said heads whereby component leads received between said pins and said forming elements are bent by said forming elements about said pins, and means for moving said heads and said pins axially relative to one another against the action of said resilient means associated with said heads and said pins, whereby the formed leads may be stripped from said pins.

7. Apparatus for shearing and bending leads of electrical components, which comprises a reciprocable carriage including a nest for receiving an electrical component, a pair of cylindrical heads in said carriage each rotatable about an axis extending substantially perpendicular to a lead of the component when the component is positioned in the nest, and each axially slidable in said carriage, a pin extending through an axial bore in each of said heads, resilient means urging said heads toward normal postions in which said pins project beyond the ends of said heads adjacent the nest, a forming element projecting from said end of each head adjacent the nest and spaced from the pin associated with said head, gear means drivingly connected to said heads, rack means cooperable with said gear means for rotating said heads and movable in a direction parallel to the direction of movement of said carriage, a member slidably mounted on said carriage for limited movement relative to said carriage in the direction of movement of said carriage and engageable with said rack means, lead shearing means, including a shearing blade carried by said slidably mounted member, spaced a predetermined distance from the longitudinal axis of each of said pins for shearing a lead to proper length, means for moving said slidably mounted member, resilient means for restraining movement of said carriage with said slidably mounted member whereby said shearing means shear the component leads to proper length, said slidably mounted member subsequently moving said carriage therewith, resilient means for restraining movement of said rack means with said carriage whereby said rack means and said gear means rotate said heads and component leads received between said pins and said forming elements are bent by said forming elements about said pins, said slidably mounted member subsequently moving said rack means with said carriage, whereby said forming elements stop bending the leads about said pins, and means for moving said heads from their normal postions axially relative to said pins against the action of the resilient means associated with said heads, whereby the formed leads may be stripped from said pins.

8. Apparatus for shearing and bending leads of electrical components, which comprises a reciprocable carriage including a nest for receiving an electrical component, a pair of cylindrical heads in said carriage each rotatable about an axis extending substantially perpendicular to a lead of the component when the component is positioned in the nest, and each axially slidable in said carriage, cylindrical drive members in said carriage drivingly connected to said heads for rotating said heads, resilient means urging said heads toward normal positions adjacent said drive members, a pin extending through axially aligned bores in each of said drive members and its associated head and projecting beyond the end of said head adjacent the nest when said head is in its normal position, a forming element projecting from said end of each head adjacent the nest and spaced from the pin associated with said head, gears on said drive members, resiliently biased rack means cooperable with said gears for rotating said heads and movable in a direction parallel to the direction of movement of said carriage, a member slidably mounted on said carriage for limited movement relative to said carriage in the direction of movement of said carriage and engageable with said rack means, lead shearing means, including a shearing blade carried by said slidably mounted member, spaced a predetermined distance from the longitudinal axis of each of said pins for shearing a lead to proper length, a ram secured to said slidably mounted member, first switch means for actuating said ram, a pin slidable in said carriage and projecting into the nest, the movement of a component into the nest moving said pin to operate said first switch means to cause said ram to move said slidably mounted member in one direction, friction type locking means for restraining movement of said carriage with said slidably mounted member whereby said shearing means shear the component leads to proper lengths, said slidably mounted member subsequently moving said carriage relative to said resiliently biased rack means, whereby said rack means and said gears rotate said heads and component leads received between said pins and said forming elements are bent by said forming elements about said pins, and subsequently moving said rack means with said carriage whereby said forming elements stop bending the leads about said pins, second switch means for actuating said ram to move said slidably mounted member and said carriage in a reverse direction to a position in which a component may be received in the nest, means movable with said ram for actuating said second switch means, a pivoted arm on said carriage engaged with said heads, and cam means engageable with said arm during movement of said carriage for pivoting said arm to move said heads from their normal positions axially relative to said pins against the action of the resilient means associated with said heads, whereby the formed leads may be stripped from said pins and the component discharged from said nest.

9. Apparatus for forming wire, which comprises a movable carriage, a cylindrical head on said carriage rotatable about its axis, a pin extending through an axial bore in said head, said head and said pin being movable axially relative to one another, resilient means urging said head and said pin toward normal positions with respect to one another in which said pin projects beyond one end of said head, a forming element projecting from the one end of said head and spaced from said pin, gear means drivingly connected to said head, rack means cooperable with said gear means for rotating said head, means for moving said carriage relative to said rack means whereby said rack means and said gear means rotate said head and a wire received between said pin and said forming element is bent by said forming element about said pin, and means responsive to the movement of said carriage for moving said head and said pin from their normal positions relative to one another against the action of said resilient means, whereby the formed wire may be stripped from said pin.

10. Apparatus for forming leads of electrical components, which comprises a movable carriage including a nest for receiving an electrical component, a pair of cylindrical heads in said carriage each rotatable about an axis extending substantially perpendicular to a lead of the component when the component is positioned in the nest, a bending pin extending through an axial bore in each of said heads, said heads and said pins being movable axially relative to one another, resilient means urging said heads and said pins toward normal positions with respect to one another in which said pins project beyond the ends of said heads adjacent the nest, a forming element projecting from the end of each head adjacent the nest and spaced from the pin associated with said head, gear means drivingly connected to said heads, rack means cooperable with said gear means for rotating said heads and movable in a direction parallel to the direction of movement of said carriage, means for moving said carriage relative to said rack means whereby said rack means and said gear means rotate said heads and component leads received between said pins and said forming elements are bent by said forming elements about said pins, means on said carriage for subsequently moving said rack means with said carriage whereby said forming elements stop bending the leads about said pins, and means for moving said heads and said pins axially relative to one another against the action of said resilient means, whereby the formed leads may be stripped from said pins.

References Cited in the file of this patent

UNITED STATES PATENTS

| | | |
|---|---|---|
| 898,424 | Bartlett | Sept. 15, 1908 |
| 2,653,632 | Corbett | Sept. 29, 1953 |
| 3,002,538 | Wilson | Oct. 3, 1961 |
| 3,010,492 | Ryder et al. | Nov. 28, 1961 |

UNITED STATES PATENT OFFICE
CERTIFICATE OF CORRECTION

Patent No. 3,157,220 November 17, 1964

George Svoboda

It is hereby certified that error appears in the above numbered patent requiring correction and that the said Letters Patent should read as corrected below.

Column 1, line 13, for "appratus" read -- apparatus --; line 47, for "components" read -- component --; column 3, line 51, for "rear" read -- gear --.

Signed and sealed this 20th day of April 1965.

(SEAL)
Attest:

ERNEST W. SWIDER
Attesting Officer

EDWARD J. BRENNER
Commissioner of Patents